May 3, 1960
C. L. KAMPA
2,934,849
ICE FISHING DEVICE
Filed July 25, 1957
2 Sheets-Sheet 1
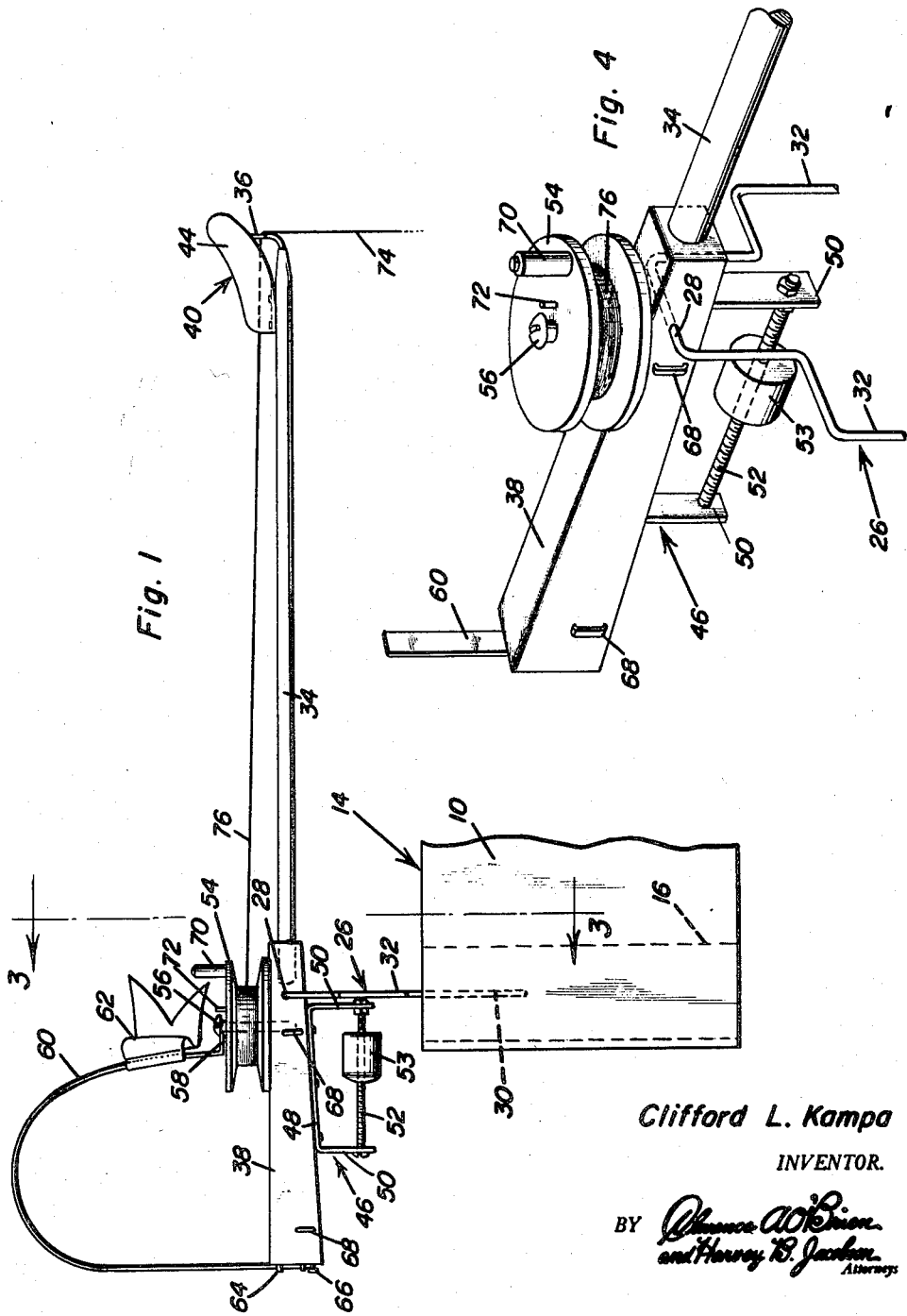
Clifford L. Kampa
INVENTOR.

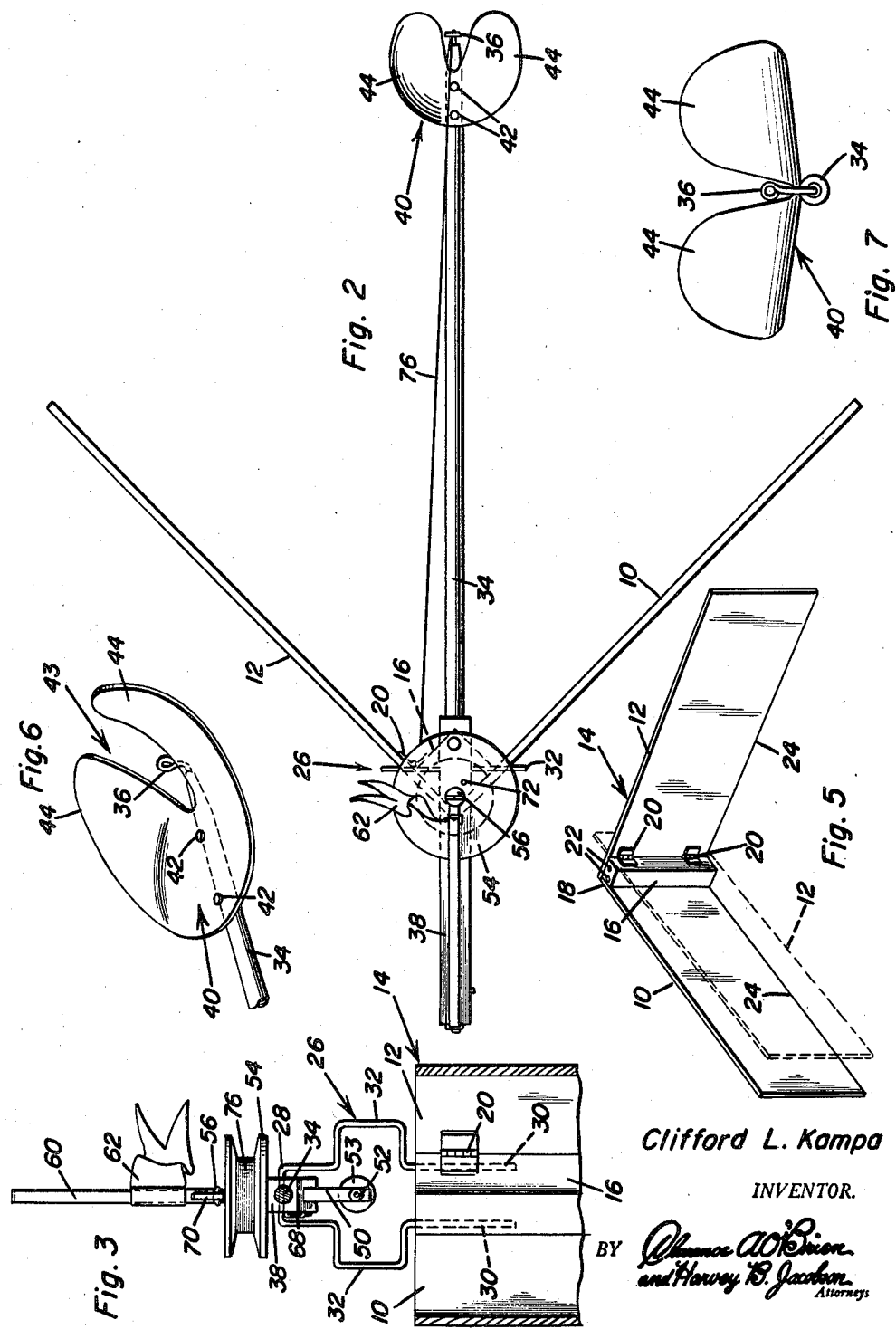

United States Patent Office 2,934,849
Patented May 3, 1960

2,934,849
ICE FISHING DEVICE
Clifford L. Kampa, Independence, Wis.
Application July 25, 1957, Serial No. 674,241
1 Claim. (Cl. 43—17)

The present invention relates to a fishing device which is expressly, although not necessarily, adapted for ice fishing.

Briefly summarized the invention, that is a preferred embodiment thereof, is characterized by a portable folding base having a support post, a bracket detachably mounted on and rising vertically above said post, a fishing rod having its rearward portion hingedly mounted atop said bracket whereby the fishing rod may tilt and swing up and down in a pendulum-like manner, a line-equipped reel mounted for operation on said fishing rod, a line guide eye attached to the forward end of said fishing rod, air current actuated vanes carried by the forward end portion of said fishing rod, and adjustable rod counterbalancing means mounted on said fishing rod rearwardly of said pivot.

The invention may be further characterized as knockdown in form in that the base is collapsible or foldable with requisite nicety into compact form. The bracket on which the reel equipped fishing rod is hinged is removable from the base. Also, a tip-up signalling flag, which is provided, is separable from the fishing rod and may be stored, when not in use, alongside of the rod by way of retaining staples carried by the handle portion of the rod.

The invention also features a novel and simple hinging bracket on which the handle portion of the rod is hingedly and tiltably mounted, said handle portion being provided on its underside, rearwardly of the pivot, with a simple easily adjustable counterweight which makes it possible to balance the fishing rod so that, depending on the air currents present and the manner in which the vanes function, the pendulous movement of the rod may be regulated and controlled. So constructed the motion of the fishing rod may be kept properly regulated for almost constant and continuous operation with the result that the portion of the fishing line which is suspended through the hole in the ice results in a bobbing movement of the line much to the advantage of the fisherman.

Novelty is also predicated on a horizontally disposed line-equipped reel carried by the rod rearwardly of the pivot point, the reel turning in a horizontal plane on a vertical axis, and the reel being mounted for turning on a headed fastener, the head of which constitutes a keeper for the laterally disposed and trippable end of a flat spring which latter serves to provide a bite signalling flag. In addition the reel is provided with a simple trip pin which triggers and releases the signalling flag as soon as the line begins to unwind from the reel.

Other objects, features and advantages will become more readily apparent from the following description and the accompanying drawings.

In the drawings, wherein like numerals are employed to designate like parts throughout the views:

Fig. 1 is a view in side elevation of an ice fishing device constructed in accordance with the principles of the invention and showing the same set-up for use, the base being fragmentarily shown;

Fig. 2 is a top plan view of the structure depicted in Fig. 1;

Fig. 3 is a section taken on the plane of the vertical line 3—3 of Fig. 1, looking in the direction of the arrows;

Fig. 4 is a perspective view wherein certain of the parts are enlarged to bring out the construction of the same, the spring of the flag being fragmentarily shown;

Fig. 5 is a perspective view of the folding base by itself;

Fig. 6 is a fragmentary perspective view detailing the wind vane means; and

Fig. 7 is a front end view on an enlarged scale observing Fig. 2 in a direction from right to left.

Starting with the collapsible or folding frame this is broadly referred to as a portable folding base and it is shown in Fig. 5. It comprises a pair of duplicate substantially rectangular wooden or equivalent panels 10 and 12. The base as an entity is denoted by the numeral 14. The inner adjacent ends of the panel connect with a vertical post 16. The post is preferably rectangular in form and the end portion 18 of the panel 10 is fixed to one side of the post. The end portion of the panel 12 is attached by upper and lower hinges 20 to an adjacent side of the post. The upper flat end of the post is provided with vertical holes which are here designated as sockets 22. It will be noticed that the bottom or lower edges 24 are coplanar and when the panels are spread apart to open position as shown in full lines the lower edges rest on the ice (not shown) and provide an adequate support. The apex which is formed at the juncture of the panels and post is an indicator whereby the over-all device may be most satisfactorily positioned depending on the velocity of air currents present at the time of fishing.

The aforementioned backet is denoted by the numeral 26 and it is fashioned from a single length of wire which is bent upon itself between its ends to define a horizontal bight portion 28 which serves as an axle or pivot and a pair of springy or resilient limbs. The terminal straight lower end portions of the limbs 30 fit telescopically and removably into the sockets to thus attach the bracket to the post. The intermediate portions of the limbs are bent as at 32 to provide hand grips to facilitate applying and removing the bracket.

The fishing rod is of miniature proportions, so to speak, and the rod proper is denoted by the numeral 34 and is provided on its outer end with a suitably bent line guide eye 36. The handle portion 38 on the inner or rearward end is provided with an opening which is hingedly mounted (Fig. 4) on the pivot portion 28. Thus the fishing rod is adapted to tilt or to swing up and down in a vertical plane on a horizontal axis in a now generally well known pendulum-like manner. The deflector on the outer or forward end of the rod is denoted by the numeral 40 and is a simple dished plate which is centrally fastened to the rod at 42 (Fig. 6). The concave side faces upwardly and the forward end is bifurcated at 43 and the furcations 44 are fashioned into wind vanes. Thus the wind striking the vanes will impart the desired up and down tilting motion to the fishing rod. So that this action may be controlled as requirements indicate a U-shaped bracket 46 has its bight portion 48 fastened to the underneath side of the handle rearwardly of the hinge point. The depending arms of the bracket 50 carry a horizontal feed screw 52 on which a manually turned adjusting weight 53 is mounted for operation in the manner shown. This provides the desired counterbalance means.

The reel 54 is mounted in a horizontal plane and turns on a vertical axis provided by a headed screw fastener 56 with the head of the screw spaced above the adjacent head of the reel to function as a keeper for the laterally directed free end 58 of the arm of the signalling or bite indicating flag. The arm takes the form of a flat spring 60 the free end being bent as shown to provide the stated keeper and this end portion of the arm being provided with a suitable signalling flag 62. The opposite free end of the spring is removably inserted and held in staples 64 secured to the rear end of the handle. The member 66 is merely a stop to limit the downward insertion of the arm through the staples 64. The aligned staples 68 at longitudinally spaced points on the handle are for storage of the spring arm 60 when it is detached and not in use. The numeral 70 designates a suitable handle for the reel and 72 denotes a trip lug or pin. This is eccentrically positioned and vertically arranged so that when the portion 74 of the fishing line is taken by the fish and the portion 76 starts to unwind from the reel, the turning of the reel will cause the trip pin 72 to engage and trigger the arm release or trigger from beneath the keeper head 56 in an obvious manner.

It will be noticed that the edges of the vanes or wings are rounded and bent and curved upward so as to catch the breeze which will depress and tip the rod downward. Under this condition the counterbalance operating against the wind force will elevate the tip of the rod thus producing a continuous agitation of the baited line.

It will also be clear that the device when in operation will continuously agitate or vibrate by means of the rocking motion upwards and downwards, as the force of the wind or breeze depresses the end of the rod, the counterbalancing means operating in a reverse direction elevating the rod.

It will be evident upon considering the specification in conjunction with the drawings that a fishing device, particularly for ice fishing, has been evolved and produced which is simple, practical, easy to erect and knockdown, and which will otherwise fulfill the purposes for which it is intended.

Minor changes in shape, size, materials and rearrangement of parts may be resorted to in actual practice without departing from the spirit of the invention or the scope of the invention as claimed.

What is claimed as new is as follows:

An ice fishing device comprising a portable support having a relatively stationary horizontal elevated journal, a fishing rod having a handle mounted on one end of the rod, said handle being hingedly mounted at the median portion thereof on said journal, an inverted U-shaped bracket having a bight portion superimposed upon and secured lengthwise to an underneath side of the handle adjacent to but rearwardly of the position of said journal, said U-shaped bracket having lateral depending end portions, a screw-threaded rod spanning the space between said end portions and parallel to the bight portion and adapted to assume a position in parallelism to the longitudinal axis of said handle, said bracket and screw-threaded rod being unobstructed and wholly accessible, a counter-weight mounted operatively and for adjustment on said rod, said counter-weight being manually regulatable, a line-equipped reel in a horizontal plane, a vertical headed fastener connecting said reel for rotation to said handle rearwardly of the journal, the head of said fastener being disposed in a plane above the top head of the reel and cooperating therewith in providing a keeper, a signal flag and a spring arm carrying said flag, one end of said arm being detachably connected with the extreme rear end of said handle, the other end of said arm being laterally bent and providing a releasable catch which is engageable with said keeper, said reel being provided with an upstanding trip which is engageable with said catch.

References Cited in the file of this patent

UNITED STATES PATENTS

| | | |
|---|---|---|
| 1,316,040 | Jamison | Sept. 16, 1919 |
| 1,659,129 | Asaro | Feb. 14, 1928 |
| 2,663,962 | King | Dec. 29, 1953 |
| 2,732,649 | Tuttle | Jan. 31, 1956 |